US00RE41592E

(19) United States
(12) Reissued Patent
Lynn et al.

(10) Patent Number: US RE41,592 E
(45) Date of Reissued Patent: Aug. 31, 2010

(54) METHOD OF PRODUCING GYPSUM/FIBER BOARD

(76) Inventors: Michael R. Lynn, 2640 N. Prindle Ave., Arlington Heights, IL (US) 60004; Frederick T. Jones, 354 W. Trail, Grayslake, IL (US) 60030; Gregory J. Cormier, deceased, late of Fall River (CA); Gladys Cedella Cormier, legal representative, 262 Piggott Ave., Fall River, N.S. (CA), B2T 1S6

(21) Appl. No.: 11/038,004

(22) Filed: Jan. 19, 2005

Related U.S. Patent Documents

Reissue of:
(64) Patent No.: 6,508,895
Issued: Jan. 21, 2003
Appl. No.: 09/370,954
Filed: Aug. 10, 1999

U.S. Applications:
(60) Provisional application No. 60/099,646, filed on Sep. 9, 1998.

(51) Int. Cl.
*B32B 37/15* (2006.01)
*B32B 37/24* (2006.01)
B32B 13/02; B32B 13/14

(52) U.S. Cl. ..... 156/39; 156/42; 156/44; 156/346

(58) Field of Classification Search ..... 156/39, 156/42, 44, 346; 264/333, 113, 86; 425/83.1, 425/84; 428/703, 294.7; 442/42
See application file for complete search history.

(56) References Cited

U.S. PATENT DOCUMENTS

| | | | | |
|---|---|---|---|---|
| 2,200,155 | A | | 5/1940 | Camp et al. |
| 4,257,710 | A | | 3/1981 | Delcoigne et al. |
| 4,288,263 | A | | 9/1981 | Delcoigne et al. |
| 4,334,786 | A | | 6/1982 | Delcoigne et al. |
| 4,364,790 | A | | 12/1982 | Delcoigne et al. |
| 4,378,405 | A | | 3/1983 | Pilgrim |
| 4,383,960 | A | * | 5/1983 | Delcoigne et al. ..... 264/333 |
| 4,450,022 | A | | 5/1984 | Galer |
| 4,572,861 | A | | 2/1986 | Barretto Garcia et al. |
| 4,647,496 | A | | 3/1987 | Lehnert et al. |
| 4,916,004 | A | | 4/1990 | Ensminger et al. |
| 5,135,805 | A | | 8/1992 | Seller et al. |
| 5,221,386 | A | | 6/1993 | Ensminger et al. |
| 5,320,677 | A | | 6/1994 | Baig |
| 5,342,566 | A | | 8/1994 | Schäfer et al. |
| 5,350,554 | A | | 9/1994 | Miller |
| 5,477,652 | A | | 12/1995 | Torrey et al. |
| 2002/0095893 | A1 | | 7/2002 | Walters et al. |

FOREIGN PATENT DOCUMENTS

| | | |
|---|---|---|
| EP | 0003705 | 8/1979 |

(Continued)

OTHER PUBLICATIONS

Fiberbond VHI Very High Impact Fiber–Reinforced Gypsum Wallboard Panels, May 1994.*
James Y. Oldshue, "Fluid Mixing Technology", pp. 94–95 and 525–533, McGraw–Hill, Dec. 1983.
Al Moslemi "Inorganic Bonded Wood and Fiber Composite Materials" 1990, pp. 85–87.
Louisiana Pacific "Fiberbond VHI Specifications", 1994, Two Pages.

*Primary Examiner*—Steven D Maki
(74) *Attorney, Agent, or Firm*—Novak, Druce + Quigg, LLP

(57) ABSTRACT

A gypsum/fiber board having improved impact resistance is produced by mixing predetermined amounts of fibers, calcined gypsum and water to form a mixture of wetted, loose fibers; laying out a reinforcing mesh over the upper surface of a forming belt; depositing said mixture on said mesh to form a layer of said mixture, said; and compressing said mesh together with said layer of mixture to embed said mesh in the lower surface of said layer to form a board composed of bonded fibers and gypsum with said mesh embedded in the surface thereof.

20 Claims, 5 Drawing Sheets

FOREIGN PATENT DOCUMENTS

| | | | | |
|---|---|---|---|---|
| EP | 0154094 | | | 9/1985 |
| FR | 2457754 | | | 12/1980 |
| FR | 2547533 | | | 12/1984 |
| GB | 771581 | | | 4/1955 |
| GB | 772581 | | | 4/1957 |
| GB | 1536663 | | | 12/1978 |
| GB | 2225599 | | * | 6/1990 |
| GB | 2316693 | | | 3/1998 |
| JP | 54-117521 | A | | 9/1979 |
| JP | 55-162487 | A | | 12/1980 |
| JP | 58-219009 | A1 | | 12/1983 |
| JP | 60-226933 | A | | 11/1985 |
| JP | 3120013 | | | 5/1991 |
| JP | 04-501703 | A1 | | 3/1992 |
| JP | 06-505448 | A1 | | 6/1994 |
| JP | 06-198618 | A1 | | 7/1994 |
| JP | 3012205 | U | | 4/1995 |
| JP | 07-097249 | A | | 4/1995 |
| JP | 08-42111 | A1 | | 2/1996 |
| JP | 63-502975 | A1 | | 11/2009 |
| WO | 98/09033 | A1 | | 3/1998 |

* cited by examiner

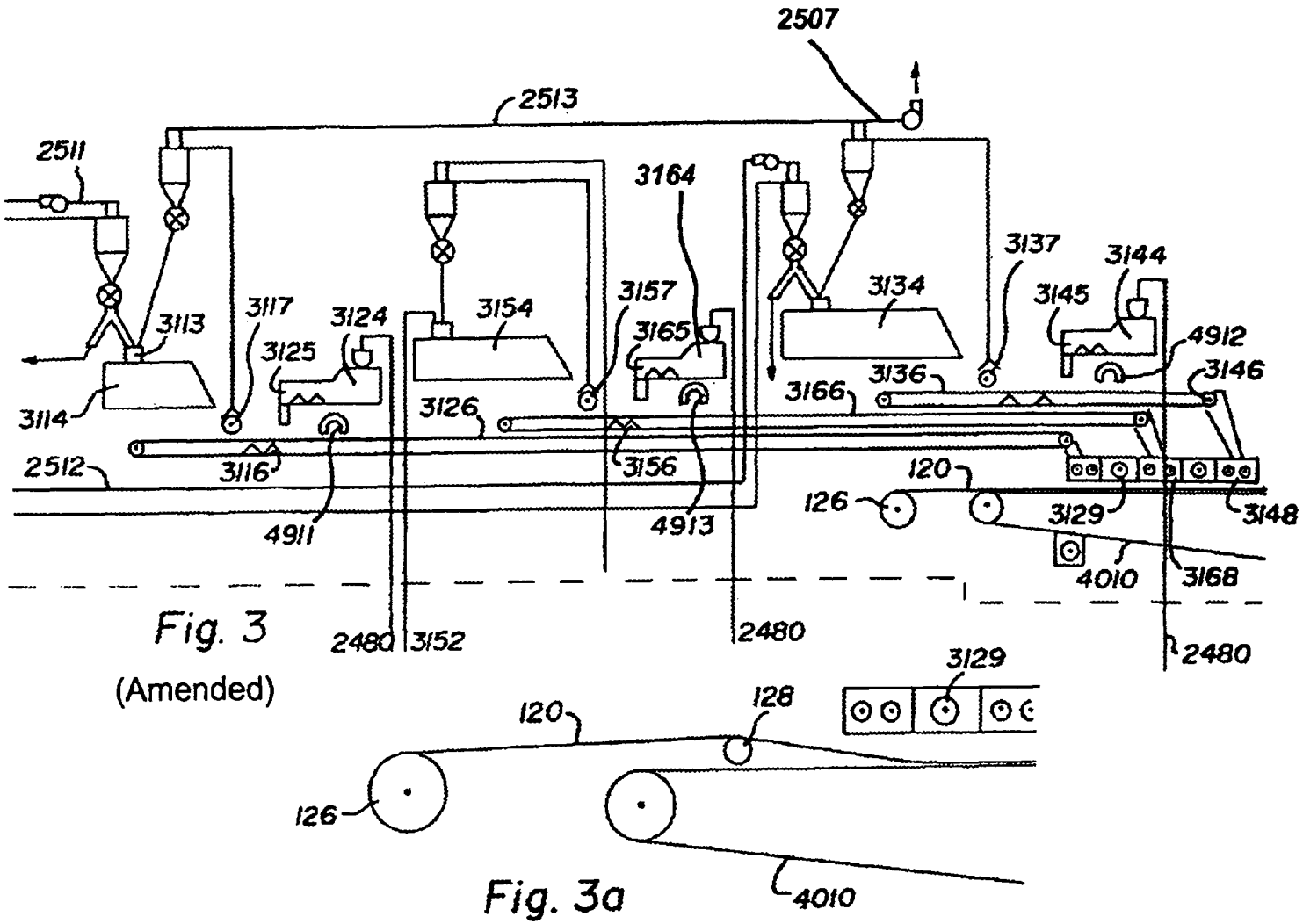
Fig. 3
(Amended)
Fig. 3a

*Fig. 6* (New) (Prior Art)
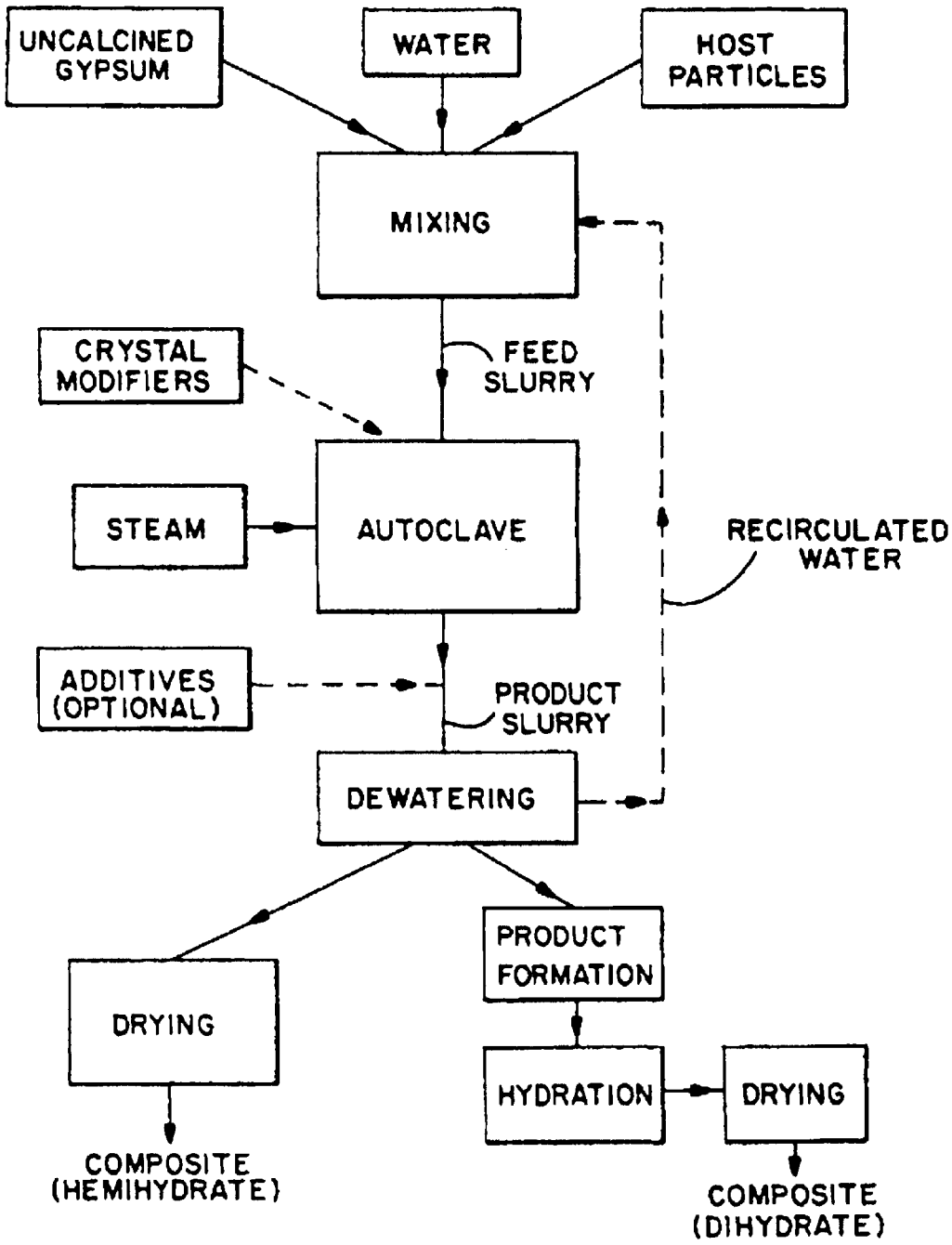

*Fig. 7* (New) (Prior Art)
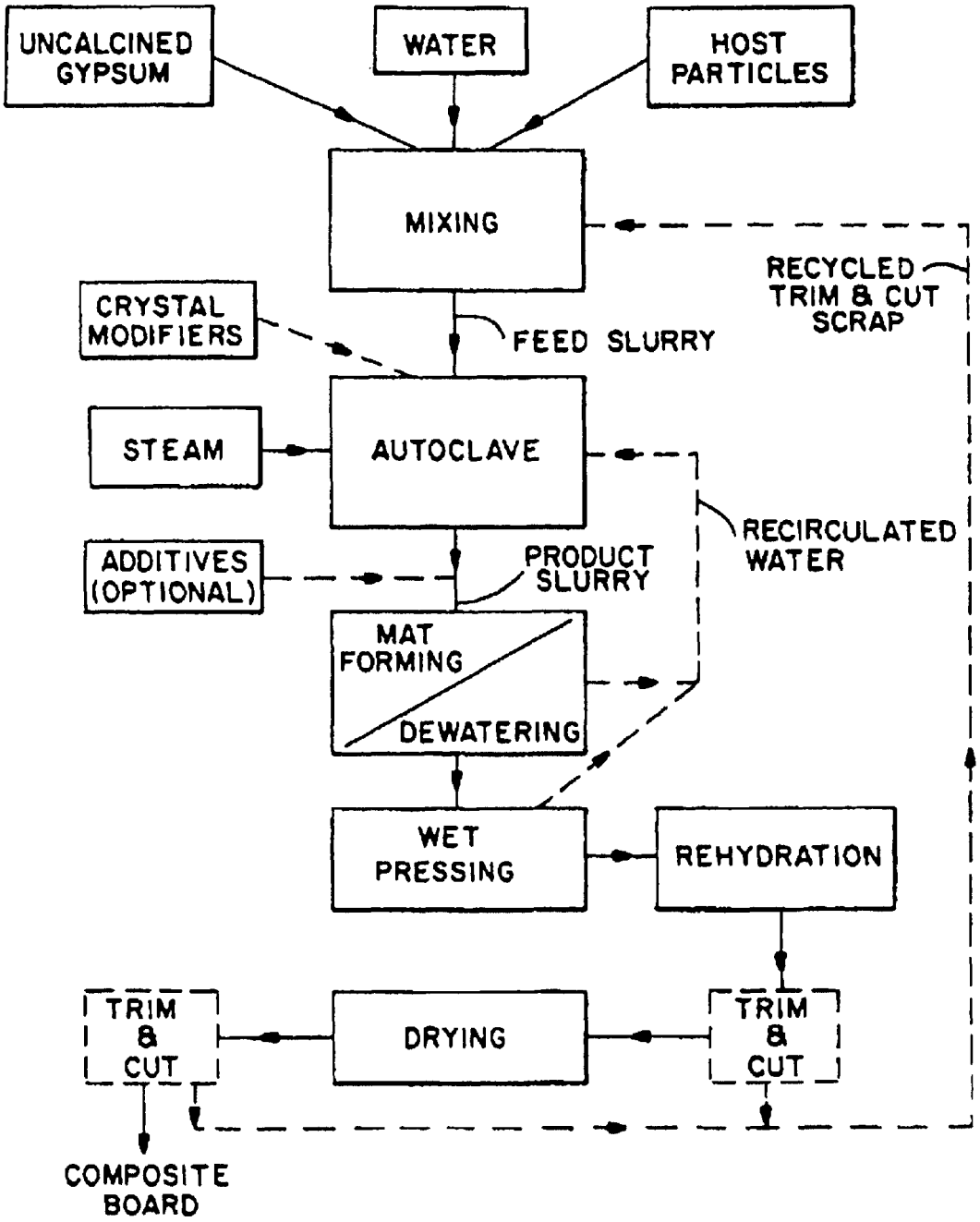

METHOD OF PRODUCING GYPSUM/FIBER BOARD

Matter enclosed in heavy brackets [ ] appears in the original patent but forms no part of this reissue specification; matter printed in italics indicates the additions made by reissue.

This application claims the benefit of U.S. Provisional Application No.: 60/099,646 filed Sep. 9, 1998.

BACKGROUND OF THE INVENTION

The present invention relates generally to a paperless gypsum/fiber board with improved impact resistance and to a process for making such a gypsum/fiber board. More particularly, the present invention relates to a multi-layer gypsum/fiber board having a fiberglass mesh embedded in the backside to provide improved impact resistance.

Conventional gypsum wallboard or panel is typically manufactured from a plaster slurry wherein a wet slurry of calcium sulfate hemihydrate, generally referred to as calcined gypsum, is placed between two layers of paper and the slurry is allowed to set. The set gypsum is a hard and rigid product obtained when the calcined gypsum reacts with water to form calcium sulfate dihydrate. Calcined gypsum is either calcium sulfate hemihydrate ($CaSO_4 \cdot ½H_2O$) or calcium sulfate anhydrite ($CaSO_4$). When calcium sulfate dihydrate is heated sufficiently, in a process called calcining, the water of hydration is driven off and there can be formed either calcium sulfate hemihydrate or calcium sulfate anhydrite, depending on the temperature and duration of exposure. When water is added to the calcined gypsum to cause the gypsum to set, in essence, the calcined gypsum reacts with water, and the calcined gypsum is rehydrated. In typical gypsum wallboard, the two layers of paper contain the slurry and provide the strength required in installation and use. The wallboard is cut into discrete lengths to accommodate subsequent handling and then dried in heated dryers until the board is completely dry. The bending strength of the wallboard depends largely on the tensile strength of the paper. The set gypsum serves as the core and accounts for fire resistance and can be modified for various applications. The paper determines the nature of the application for the board and the surface treatment that may be used on the board.

Although paper-covered wallboard has many uses and has been a popular building material for many years, the prior art has recognized that for certain applications it would be advantageous to provide a gypsum panel that did not rely on paper surface sheets for strength and other properties. Several prior art fiber-reinforced gypsum panels are as follows:

U.S. Pat. No. 5,320,677 to Baig, which is incorporated by reference herein in its entirety, describes a composite product and a process for producing the product in which a dilute slurry of gypsum particles and cellulosic fibers are heated under pressure to convert the gypsum to calcium sulfate alpha hemihydrate. The cellulosic fibers have pores or voids on the surface and the alpha hemihydrate crystals form within, on and around the voids and pores of the cellulosic fibers. The heated slurry is then dewatered to form a mat, preferably using equipment similar to paper making equipment, and before the slurry cools enough to rehydrate the hemihydrate to gypsum, the mat is pressed into a board of the desired configuration. The pressed mat is cooled and the hemihydrate rehydrates to gypsum to form a dimensionally stable, strong and useful building board. The board is thereafter trimmed and dried. The process described in U.S. Pat. No. 5,320,677 is distinguishable from the earlier processes in that the calcination of the gypsum takes place in the presence of the cellulosic fibers, while the gypsum is in the form of a dilute slurry, so that the slurry wets out the cellulosic fibers, carrying dissolved gypsum into the voids of the fibers, and the calcining forms acicular calcium sulfate alpha-hemihydrate crystals in situ in and about the voids.

U.S. Pat. No. 5,135,805 to Sellers et al, describes a water resistant gypsum product that may be a "faceless" product, i.e. it may not include a facing sheet of paper, fiberglass mat or similar material. The gypsum products described by U.S. Pat. No. 5,135,805 typically contain reinforcing fibers, for example, cellulosic fibers, such as wood or paper fibers, glass fibers or other mineral fibers and polypropylene or other synthetic resinous fibers. The reinforcing fibers can be about 10 to about 20 wt. % of the dry composition from which the set gypsum product is made. The density of such a product is typicality within the range of about 50 to about 80 pounds per cubic foot.

U.S. Pat. No. 5,342,566 to Schafer et al, which is incorporated by reference herein in its entirety, refers to a method of producing fiber gypsum board comprising the steps of mixing in a preliminary mixing step predetermined amounts of fibers and water respectively, to form a mixture of wetted, loose fibers; mixing in a mixing step the wetted fibers with a predetermined amount of dry calcined gypsum; premixing an accelerator with one of the components of dry calcined gypsum, fiber and water; promptly laying the mixed composition into a mat; immediately degassing the mat in a first compression step, adding a predetermined amount of water onto the resultant mat; and immediately compressing the mat to form a board composed of bonded fibers and gypsum. This process may be used to produce a homogeneous board which is preferably a gypsum board reinforced by fiber, such as paper fiber, wherein several layers of board forming materials are placed on each other before the board is fully formed, pressed, and dried and wherein each of the layers is identical in composition. Schafer et al specifically describes the formation of a three layer board wherein the central, core layer has a composition which differs from the composition of the outer layers.

Carbo et al Provisional Application Serial No. 60/073,503, describes a multi-layer, paperless gypsum/fiber board and a process for making such a three layer gypsum/fiber board wherein the central, core layer has a composition which differs from the composition of the outer layers, all of which is incorporated by reference herein in its entirety.

Prior art gypsum/fiber boards have been modified by adhering a layer of mesh to the back of the board, in order to provide improved impact resistance. While such modified boards had improved impact resistance, the production rates of such board were low, the energy costs were higher, the materials cost increased, the labor cost increased, because of the need to laminate the gypsum boards to the mesh in separate processes that have control problems with respect to the lamination process and the problem of blocking between panels. The process of lamination can be difficult with any variation of thickness of the panel being covered with a mesh or solid reinforcement. With variation in thickness or profile the lamination process is a problem with respect to maintaining constant pressure across the panel. The problem of blocking panels which stick to one another is a significant problem when laminating mesh's on surfaces as the glue can actually glue the stacked panels to one another in addition the mesh on the surface.

It is the object of the present invention to provide a fiber-reinforced gypsum board that has improved impact resistance that avoids many of the problems of the prior art gypsum/fiber boards. More particularly, it is the object of present invention to provide a multi-layer gypsum/fiber board having a fiberglass mesh embedded in the backside to provide improved impact resistance as determined by Soft Body Impact Resistance according to ASTM E695 and by Hard Body Impact Resistance according to USG method as documented in independent reports HPWLI #7122 and HPWLI #7811-02. Embedding a reinforcing mesh to the gypsum/fiber board, in accordance with the present invention, provides many advantages including high production rates; better product aesthetics, integral consolidation of reinforcing mesh in board and reduced product cost. Embedding a reinforcing mesh also improves the handling properties of the board and reduces the tendency of the board to block (adhere to adjacent boards when horizontally stacked). The product of the present invention can include a flush mesh which does not mark up the face of the panel on which it is stacked, and improved retention of the reinforcement in the panels as it is protected from wearing and rubbing on the surface. Another product benefit is the tensioning of the mesh in the product to provide enhanced stiffness to the panel. In terms of the process the present invention eliminates the need to transport the panels to secondary operations, and allows the reinforced panel to be produced on a standard gypsum fiberboard line.

SUMMARY OF THE INVENTION

The present invention relates generally to a paperless gypsum/fiber board with improved impact resistance, and to a process for making such a gypsum/fiber board. The term "paperless" gypsum/fiber board, as used herein, is intended to distinguish the fiber-reinforced gypsum panels to which the present invention relates from conventional prior art gypsum panels, which are referred to as "wall board" or "dry wall" which have at least one surface comprised of paper, including "wall board" or "dry wall" having some form of fiber-reinforcement in the core.

The paperless gypsum/fiber board having improved impact resistance is produced by embedding a reinforcing mesh, preferably a flexible fiberglass mesh, in the back side of a multi-layer gypsum fiber board. In the process, the mesh is fed into the forming area of the panel before the panel is pressed prior to drying.

It is to be understood that the foregoing general description, and the following detailed description, are exemplary and explanatory only and are not restrictive of the invention, as claimed.

The accompanying drawings, which are incorporated in and constitute a part of the specification, illustrate several embodiments of the invention and together with the description, serve to explain the operation of the present invention.

BRIEF DESCRIPTION OF THE DRAWINGS

FIG. 3 is an illustration of a side view of a forming station of a production line in accordance with the present invention;

FIG. 3A is an illustration of a side view of a portion of a modified forming station of a production line in accordance with the present invention;

*FIG. 6 is a figure (FIG. 1) from U.S. Pat. No. 5,320,677 to Baig showing a schematic diagram of a process for forming a composite material according to one aspect of the invention disclosed by U.S. Pat. No. 5,320,677 to Baig.*

*FIG. 7 is a figure (FIG. 2) from U.S. Pat. No. 5,320,677 to Baig showing a schematic diagram of a process for forming a composite board according to another aspect of the invention disclosed by U.S. Pat. No. 5,320,677 to Baig.*

DETAILED DESCRIPTION OF THE PRESENT INVENTION

Figure 1:
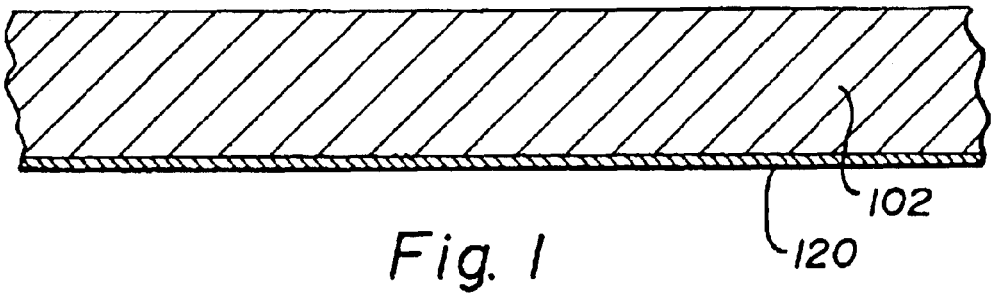
FIG. 1 is a sectional end view of a homogeneous, one-layer board of the present invention.

The present invention relates generally to a paperless gypsum/fiber board with improved impact resistance, and to a process for making such a gypsum/fiber board. The paperless gypsum/fiber board having improved impact resistance is produced by embedding a reinforcing mesh, preferably a flexible fiberglass mesh, in the backside of a multi-layer gypsum fiber board. In the process, the mesh is fed into the forming area of the panel before the panel is pressed prior to drying.

The Mesh

Enhanced and improved impact resistance of the gypsum/fiber board is provided by embedding a reinforcing mesh in the backside of the gypsum/fiber board. The mesh may be either woven or nonwoven and may be made of a variety of materials. Preferably the mesh is made from a flat yarn of an inelastic material such as fiberglass mesh. Most preferably the mesh is a fiber glass mesh having openings in the mesh of sufficient size to allow a quantity of the dry gypsum/fiber mixture to pass through the mesh and embed the mesh in set gypsum in the final product.

One useful woven fiberglass mesh is available from Bayex under the number 0040/286. Bayex 0040/286 is a Leno weave mesh having a warp and weft of 6 per inch (ASTM D-3775), a weight of 4.5 ounces per square yard (ASTM D-3776), a thickness of 0.016 inches (ASTM D-1777) and a minimum tensile of 150 and 200 pounds per inch in the warp and weft, respectively (ASTM D-5035). It is alkali resistant and has a firm hand. Other fiberglass meshes having approximately the same dimensions have opening of sufficient size to allow a portion of the gypsum/fiber mix to pass through the mesh during formation of the board and may be used.

Another useful woven fiberglass mesh is available from Bayex under the number 0038/503. Bayex 0038/503 is a Leno weave mesh having a warp of 6 per inch and weft of 5 per inch (ASTM D-3775), a weight of 4.2 ounces per square yard (ASTM D-3776), a thickness of 0.016 inches (ASTM D-1777) and a minimum tensile of 150 and 165 pounds per inch in the warp and weft, respectively (ASTM D-5035). It is alkali resistant and has a firm hand.

Yet another useful woven fiberglass mesh is available from Bayex under the number 0038/504. Bayex 0038/504 is a Leno weave mesh having a warp of 6 per inch and weft of 5 per inch (ASTM D-3775), a weight of 4.2 ounces per square yard (ASTM D-3776), a thickness of 0.016 inches (ASTM D-1777) and a minimum tensile of 150 and 165 pounds per inch in the warp and weft, respectively (ASTM D-5035). It is alkali resistant and has a firm hand. Other fiberglass meshes having approximately the same dimensions have opening of sufficient size to allow a portion of the gypsum/fiber mix to pass through the mesh during formation of the board and may be used.

Yet another useful woven fiberglass mesh is available from Bayex under the number 4447/252. Bayex 4447/252 is a Leno weave mesh having a warp of 2.6 per inch and weft of 2.6 per inch (ASTM D-3775), a weight of 4.6 ounces per square yard (ASTM D-3776), a thickness of 0.026 inches (ASTM D-1777) and a minimum tensile of 150 and 174 pounds per inch in the warp and weft, respectively (ASTM D-5035). It is alkali resistant and has a firm hand. Other fiberglass meshes having approximately the same dimensions have opening of sufficient size to allow a portion of the gypsum/fiber mix to pass through the mesh during formation of the board and may be used.

The mesh is preferably embedded in the backside of the three-layer board with the warp oriented in the longitudinal direction of the board. Because the board of the present invention is expanded multi-directionally during the pressing step, the use of a mesh which is extensible provides better bonding to the gypsum/fiber board.

It is preferred to have the mesh substantially embedded in the board and covered by the gypsum/fiber mix, because this secures the mesh to the board. Additionally, completely embedding the mesh in the gypsum/fiber mix provides the best impact resistance to the board. Completely embedding the mesh in the gypsum/fiber mix also makes the reinforcement less perceptible to the consumer.

Adhesives

In one embodiment, the mesh is treated with an adhesive in order to improve the bond between the mesh and the gypsum/fiber board. Suitable adhesives include polyvinyl acetates, polyvinyl alcohols and proprietary types. Preferably the adhesive is water activated, i.e. activated due to moistening by water of the board during the forming step of the board making process.

The Gypsum/Fiber Board Composition

The materials used to produce the gypsum fiber board are conventional materials. The term "gypsum", as used herein, means calcium sulfate in the stable dihydrate state; i.e. $CaSO_4 \cdot 2H_2O$, and includes the naturally occurring mineral, the synthetically derived equivalents, such as FGD gypsum (a synthetic gypsum which is the by-product of flue gas desulphurization), and the dihydrate material formed by the hydration of calcium sulfate hemihydrate (stucco) or anhydrite. The term "calcium sulfate material", as used herein, means calcium sulfate in any of its forms, namely calcium sulfate anhydrite, calcium sulfate hemihydrate, calcium sulfate dihydrate and mixtures thereof.

The fibers that serve to reinforce the gypsum are organic fibers, and are preferably cellulosic fibers that are readily available. For example the cellulosic fiber may be waste products such as waste paper, used newspaper, inexpensive household waste paper, and reject fibers of pulp production.

Expanded perlite is used in the core of the product in order to reduce the density of the core layer. Conventional expanded perlite may be used. Preferably the perlite is expanded to a density range of about 5 to 10 pounds per cubic foot range.

Additional components of the type conventionally used in gypsum fiberboard may be used in the board of the present invention. Such conventional components include accelerators, wetting agents, fungicides and the like.

Multi-Layer Gypsum Fiber Board

Figure 2:
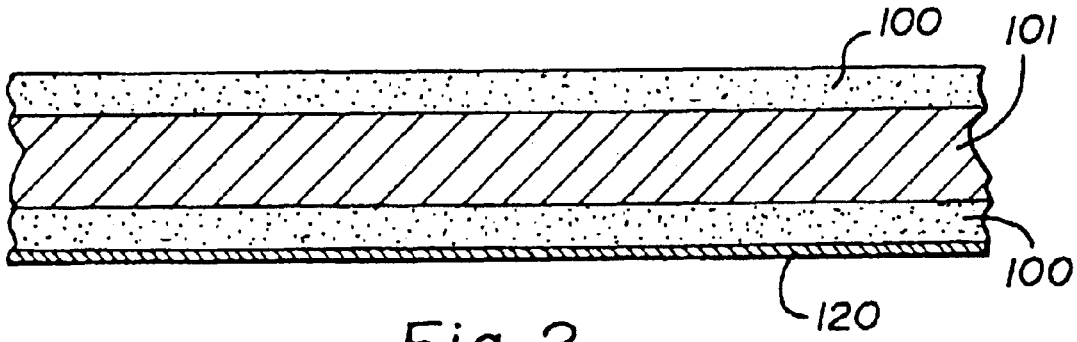
FIG. 2 is a sectional end view of a multi-layer board of the present invention.

The present invention contemplates the formation of fiber-reinforced gypsum panel having a homogeneous structure throughout, as illustrated by board 102 in FIG. 1, as well as composite boards having two or more layers having distinct compositions 100 and 101 as illustrated in FIG. 2. In board having a homogeneous structure, reinforcing mesh 120 is embedded in the back surface of the board as shown in FIG. 1. In board having a multilayer structure, reinforcing mesh 120 may be positioned between the layers, e.g. between layers 100 and 101, but preferably the mesh 120 is embedded in the back surface of outer layer 100 of the board as shown in FIG. 2. The production line for making a multilayered board, having perlite and fiber and gypsum for the middle core, will first be described. The use of the methods and equipment to produce different boards according to the present invention will then be described.

The formation of the board can be described with reference to FIG. 3 which shows three forming lines. Each forming line has three preforming belts 3126, 3166 and 3136 on which the wetted fibers and dry calcined gypsum with additives for the surface layers and wetted perlite, with or without fibers, and dry calcined gypsum for the core layer are formed. With reference to the top and bottom surface layers, wet fiber from the mills (not shown) is carried by a closed loop pneumatic conveyor 2511, 2512 to the forming station where the fibers are separated from the air by a cyclone. The separated fibers are deposited into shuttle conveyors *3113* on the top of fiber formers 3114, 3134. The fiber formers spread via discharge rolls a preselected amount of fiber, according to the weight ratio of a preferred recipe, onto the preforming belts 3126, 3136, forming a mat. *Belt 3126 has a mat scale 3116.*

Immediately downstream of the discharge rolls are scalper rolls 3117 and 3137, respectively, which scrape off excess fiber and thereby equalize the thickness of the mat. The scalper rolls can be adjusted in height to ensure that the deposited mat of fibers has a uniform weight, and a vacuum is applied at the rollers to pneumatically draw off excess fibers. Fibers scraped off by the scalper rolls are recycled pneumatically by pneumatic conveyors 2513 and 2507 into the same shuttle conveyors on the top of fiber formers 3114 and 3134. The preforming belts operate at a constant speed.

The dry calcined gypsum additive mixture *2480* from distribution bin (not shown) is fed to plaster forming bins 3124, 3164, and 3144. The plaster, as explained below, is predominately calcined gypsum, although the plaster may include other conventional additives to control the chemical process. The gypsum is metered from the forming bins by conventional means, such as conveyors, chutes, or rollers. The bins have a variable speed bottom belt conveyor with an integrated mat scale 3125, 3145, and 3165 to control the amount of plaster deposited on the preforming belt depending on the recipe. The correct amount of plaster is added as a top layer onto the fiber mat. *Elements 4911, 4913 and 4912 are permanent magnets.*

A continuous belt of mesh 120, which may be wound on supply roll 126, is fed onto forming belt 4010, as shown in FIG. 3. Preferably, the warp of mesh 120 is oriented parallel to the direction of the movement of forming belt 4010.

At the head section *3146* of the preforming belts *3136*, the fiber plaster layer is guided downward onto mixing heads 3129, and 3148 and 3168. The mixing heads comprise sets of spike rollers (not shown) which thoroughly mix the fiber and plaster into a homogeneous composition and carry the mixture from the head of the preforming belt (infeed) to the outfeed of the mixing head onto mesh 120 positioned on the forming belt 4010. Depending upon the distance from the preforming belt head to the mixing head, a series of spike rolls controls the downward motion of the material. A portion of the fiber/plaster mix falls through the openings of the reinforcing mesh 120 as the mesh moves on forming belt 4010. Spraying nozzles apply additional water to the bottom layer of the mat.

FIG. 3A illustrates an alternative embodiment in which mesh elevating bar 128 is positioned between mesh 120 and forming belt 4010. Preferably bar 128 extends across the width of forming belt 4010. Bar 128 serves to space mesh 120 about one inch above the surface forming belt 4010 as mesh 120 passes under mixing head 3129. The spacing of mesh 120 above forming belt 4010 allows a portion of the fiber/gypsum mixture falling from mixture head 3129 to pass through the mesh to forming belt 4010 and embed the mesh, at least partially, in the finished board. If desired, bar 128 may be vibrated to cause a greater quantity of the gypsum/fiber mixture to pass through mesh 120.

Figure 5:
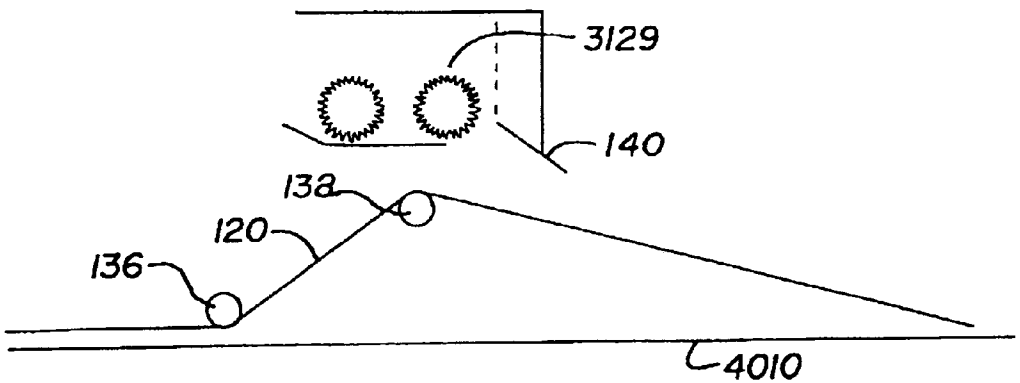
FIG. 5 is an illustration of a side view of a portion of another embodiment of the forming station of a production line in accordance with the present invention.

FIG. 5 illustrates another embodiment in which the mesh 120 passes under tensioning roller 136 and over placement roll 138 before it moves downwardly toward forming belt 4010. Placement roll 138 serves to space mesh 120 several inches above the surface forming belt 4010 as mesh 120 passes under mixing head 3129. The spacing of mesh 120 above forming belt 4010 allows a portion of the fiber/gypsum mixture falling from mixing head 3129 to pass through the mesh to forming belt 4010 and embed the mesh, at least partially, in the finished board. The optimum spacing of mesh 120 above forming belt 4010 is dependent upon the size of the openings in mesh 120, the moisture content of the fiber/gypsum mixture, the speed of forming belt 4010 and other process operating conditions. In the embodiment shown in FIG. 5, a spreading lip 140, that extends across the width of forming belt 4010, is attached to the outfeed side of mixing head 3129. Spreading lip 140 serves to spread the mixture of wefted fibers and gypsum across the width of the reinforcing mesh at a point where mesh 120 is elevated above forming belt 4010. The embodiment shown in FIG. 5 allows an increased quantity of the fiber/gypsum mixture to pass through the mesh to forming belt 4010 and produce a board in which the mesh is more completely embedded.

For a multilayered board, the core layer is formed in a similar manner to that of the surface layer. In the example being described, a lower percentage of fiber is included in the core layer because a volume of expanded perlite is used in the core layer. Expanded perlite is included in the core layer to reduce the overall specific weight of the board. The expanded perlite in combination with the gypsum provide a non combustible core material which enables the core to pass the ASTM E136 test procedure. Preferably, the mixture of wetted paper fibers and perlite particles are moisturized so that they will carry the water necessary to hydrate the plaster to optimum strength added to form the core layer. As explained below, in the preferred embodiment as adhesive, preferably liquid starch, is first mixed with the water for moistening the perlite, and the fibers are separately mixed with water. The wetted fibers and wetted perlite are then mixed together to form a uniform mixture.

Referring again to FIG. 3, a wetted perlite, starch and fiber mixture *3152* (from conveyor not shown) is deposited in fiber former 3154, which is identical in structure and operation to formers 3114, 3134. The perlite, starch and fiber mixture is deposited onto preforming belt 3166 through discharge rolls, in the same manner as the board surface layers. Preforming belt 3166 layers the perlite, starch and fiber mixture from fiber former bin 3154 with the plaster from forming bin 3164 and delivers the components to a mixing head 3168. Forming bin 3164 includes an integrated mat scale 3165. The core layer forming line includes a scalper roller 3157, mat scales 3156, and a mixing head 3168 that operate in the same manner as the elements in the surface forming line.

Figure 4:
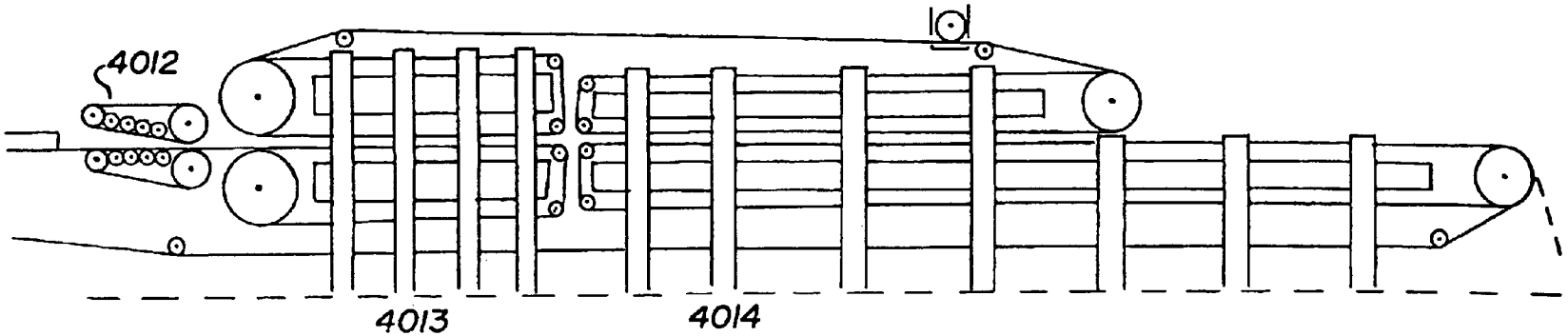
FIG. 4 is an illustration of a side view of a pressing area of a production line in accordance with the present invention.

Following the formation of the mesh backed mat on the forming belt 4010, the three layered mat is pressed by a press line, shown in FIG. 4. In one embodiment, the forming belt 4010 is also part of the press line and extends through the press and calibrating sections. In another embodiment (not shown), there is an open gap between the degassing station and the compression station. Behind the last compressing roller of the degassing station, spraying nozzles are installed for adding additional water for moistening the top surface of the mat.

The press line includes three main sections, the degassing station 4012, the compression station 4013, and the calibration station 4014. These stations can be adjusted to vary the spacing between the conveyor belts as well as the pressure being applied to the mat or gypsum, fibers, additives, and other materials. The adjustment of the station, therefore, allows the user to vary the thickness of the board.

Initially, the mat is pre-compressed by the degassing station 4012 to remove air from the mat. For a standard board, this station reduces the mat from a thickness of several inches close to the final thickness that can vary, e.g. from ⅜ to ¾ inch. Taper belts are guided into this press along the outboard edges and center of the mat. The taper belts impart a taper into the pressed board along the edges of the panels. These tapers are beneficial for the taping and finishing of panels prior to decoration. Next, the degassed mat is pressed in compression station 4013 where the mat is subject to a high load and pressed to the final board thickness. The mat then goes through calibration station section 4014 which holds the thickness of the board to allow the setting process to continue.

After pressing and prior to drying, the boards are cut and prepared to enter the dryers. The boards, which are formed and pressed endlessly, are pre-trimmed and cut into e.g. 24 foot long pieces. High-pressure water jets may be used to cut and trim the board. For example, 2 stationary jets may be used to trim the sides, while a moving water jet cross cuts the board to length. While in the cutting area and immediately prior to, the board is supported by a conveyor belt that provides forward motion. Alternatively, airjets or similar means (not shown) may provide an air cushion as is well known in the art. Belt conveyors (not shown in FIG. 4) accelerate the board to a high conveying speed.

Noncombustile Board

In a preferred embodiment, a three layer fiber-reinforced board is produced with a core having a low content of organic materials that allows the core to pass the ASTM E 136 test procedure. The improved fiber-reinforced board of the present invention may be classified as non combustible because the various code bodies, e.g. BOCA, provide for the removal of ⅛" from both the top and the bottom layers of the board prior to the application of the ASTM test procedure to core of the board. With the removal of the surface layers containing relatively high levels of paper fibers, the remaining portion, i.e. the core, becomes non-combustible. Prior art fiberboards were relatively non-combustible because they employ non-combustible fiber such as asbestos and minerals such as aluminum trihydrate that reduce the heat released during the test. The board of the present invention passes the ASTM E136 test because the composition of the core contains a total of no more than 2% organic material, including a nominal 0.6% starch sprayed onto the perlite, with a paper content not exceeding 1.4% including paper from clips (fiber) and paper from recycled panel materials. However the board of the present invention has high strength that is provided by the high paper fiber content in the surface layers.

In this embodiment, the composition of the three layers is shown below in Table 1, including bottom surface layer ("SLB"), the top surface layer ("SLT"), and the center, core layer ("CL").

TABLE 1

| COMPONENT | SLB | SLT | CL | Dimension |
|---|---|---|---|---|
| Paper Fiber | 18 | 18 | 1.4 | % |
| Plaster | 82 | 82 | 62 | % |
| Perlite | 0 | 0 | 36 | % |
| Starch | 0 | 0 | 0.6 | % |

Reinforcement Process

The reinforcement process consists of laying out a fiberglass mesh over the forming belt, spreading the bottom surface layer, consisting of mixed paper fibers and plaster over the fiberglass mesh, followed by the application of additional water required for hydration. Once the surface layer/fiberglass mesh configuration has been established the core and top layers are mixed, spread and deposited over the bottom surface layer. At this point, a 3-layer mat is formed and brought forward to the precompressor where excess air is removed. Additional water required for hydration is added to the top surface layer and the mat is conveyed forward through the press. In the press the materials are compressed and the plaster sets to bind all the materials together in the green /. At the same time the fiberglass mesh is embedded solidly into the bottom surface of the green board.

The continuous green board exits the press, is cut to size with a high-pressure water-jet and individual panels are conveyed to the dryer. The free moisture after hydration is removed, the panels are conveyed to the coating line where a sealant Is applied to the top surface of the panels. The panels are then conveyed to a secondary dryer where excess moisture is removed from the top surface of the panels. The panels are conveyed to the finishing line, cut-to-size, graded and packaged for shipping.

The following example will serve to illustrate the manufacture of a gypsum/fiber board product within the present invention, that is a three layer fiber-reinforced board produced with a core having a relatively low content of organic material in order to be classified as a noncombustible building material as specified by various building codes (e.g. BOCA) and as tested according to ASTM E136. The board of the present invention achieves a noncombustible rating because the composition of the core contains a total of not more than about 2% organic materials, including a nominal 0.6% starch sprayed onto the perlite, and a paper content not exceeding 1.4% including paper from clips (fiber) and paper from recycled panel materials. However, the board of the present invention has high strength that is provided by the paper fiber content in the surface layers. However, it should be understood that this example is set forth for illustrative purposes and that many other gypsum fiber products are within the scope of the present invention.

EXAMPLE

Composite paperless fiber reinforced gypsum panels are produced in the following manner. Calcined gypsum (calcium sulfate hemihydrate) is blended with recycled paper fibers, expanded perlite, starch, water and potassium sulfate to form a three-layer board. Three formulations of fiber and gypsum, shown below in Table 2, are prepared for use as the bottom surface layer ("SLB"), as the top surface layer ("SLT"), and as the center layer ("CL"). These formulations are used to prepare a 3-layer gypsum/fiber board ⅝ inches thick, using the continuous process and apparatus described above under the heading "MULTI-LAYER GYPSUM FIBER BOARD."

TABLE 2

| | SLB % Dry | SLT % Dry | CL % Dry |
|---|---|---|---|
| Part of Total Board % | 28.0 | 28.0 | |
| Component in Layer | | | |
| Fiber | 18.0 | 18.0 | 1.4 |
| Gypsum | 82.0 | 82.0 | 61.4 |
| Perlite | 0 | 0 | 36.6 |
| Starch | 0 | 0 | 0.6 |
| Dry Basis Total Layer | 100 | 100 | 100 |
| Water | | | |
| Wet Basis Total Layer | | | |

The fiber used is a scrap paper fiber from magazines, newspapers and similar materials. The "plaster" is about 97% calcium sulfate hemihydrate, the balance being inert impurities. The plaster requires about 18% by weight of water to form the complete hydrate. The reinforcing mesh was the Bayex 0038/503, described above.

The resulting three-layer board is ⅝ inches thick and has a density of 55 pounds per cubic foot of which the center layer is 44% and the surface layers 28% each. Owing to the relatively low paper content of the center layer, the resulting board may be classified as a noncombustible building material as specified by various building codes (e.g. BOCA). The improved fiber-reinforced board of the present invention achieves a noncombustible rating because the building codes (e.g. BOCA) allows the removal of ⅛" from both the top and the bottom layers of the board prior to combustion testing. With the removal of the surface layers containing relatively high levels of paper fibers, the remaining portion, the core, is noncombustible when tested in accordance with ASTM E136. Prior art fiberboards are relatively noncombustible because they employ noncombustible fiber such as asbestos and minerals such as aluminum trihydrate, which reduces the heat released during the combustion test. The board of the present invention achieves a noncombustible rating because the composition of the core contains a total of not more than about 2% organic materials, including a nominal 0.6% starch sprayed onto the perlite, and a paper content not exceeding 1.4% including paper from clips (fiber) and paper from recycled panel materials. However, the board of the present invention has high strength that is provided by the paper fiber content in the surface layers. The board had superior impact resistance, as shown by ASTM Test E-695, compared to similar board with no mesh reinforcement.

The board produced in the foregoing example was tested for impact resistance in accordance with the test method as prescribed under ASTM E695. Several commercially available ⅝-inch thick boards were also tested in accordance with ASTM E695. The results of the tests are shown below in Table 3.

TABLE 3

| BOARD TYPE | IMPACT STRENGTH (ft-lb) |
|---|---|
| Type X gypsum board | 120 |
| FIBEROCK AR | 150 |
| BOARD OF EXAMPLE | >250 |

Type X gypsum board is a conventional gypsum wallboard. The FIBEROCK AR is a commercial product designated as Abuse Resistant that is produced without fiberglass mesh. The impact strength of the BOARD OF EXAMPLE exceeded the maximum limit of the apparatus on which it was tested.

The forms of invention shown and described herein are to be considered only as illustrative. It will be apparent to those skilled in the art that numerous modifications may be made therein without departing from the spirit of the invention and the scope of the appended claims.

We claim:

1. A method of producing a gypsum/fiber board having improved impact resistance, said method comprising the steps of:

mixing predetermined amounts of water and fibers, and dry calcined gypsum to form a mixture of wetted, loose fibers and dry calcined gypsum;

laying out a reinforcing mesh over the upper surface of a forming belt;

spacing said mesh above said forming belt;

depositing said mixture on said mesh to form a layer of said mixture, said layer of mixture having substantially uniform consistency;

allowing a portion of said mixture to pass through said mesh to said forming belt;

adding additional water to said formed layer;

compressing said mesh together with said layer of mixture to embed said mesh in the lower surface of said layer and to form a board composed of bonded fibers and gypsum with said mesh embedded in the surface thereof; and drying said board to provide a finished board.

2. A method of producing a gypsum/fiber board having improved impact resistance, said method comprising the steps of:

mixing predetermined amounts of fibers and water to form a mixture of wetted, loose fibers;

mixing said wetted fibers with a predetermined amount of dry calcined gypsum to form a mixed composition;

laying out a reinforcing mesh over the upper surface of a forming belt;

spacing said mesh above said forming belt;

depositing said mixed composition on said mesh to form a layer of said mixed composition, said layer of mixed composition having substantially uniform consistency;

allowing a portion of said mixed composition to pass through said mesh to said forming belt;

adding additional water to said formed layer;

compressing said mesh together with said layer of mixed composition to embed said mesh in the lower surface of said layer and to form a board composed of bonded fibers and gypsum with said mesh embedded in the surface thereof; and drying said board to provide a finished board.

3. The method of claim 2, including the additional step of causing a portion of said mixed composition to pass through the openings of said mesh prior to said compression step.

4. The method of claim 2, wherein said mesh is vibrated across its width at the point said mixed composition is deposited on said mesh.

5. The method of claim 2, including the additional step of adding water to said deposited layer of mixed composition before said formed layer is compressed.

6. A method of producing a gypsum/fiber board having improved impact resistance, said method comprising the steps of:

mixing predetermined amounts of fibers and water to form a mixture of wetted, loose fibers;

mixing said wetted fibers with a predetermined amount of dry calcined gypsum to form a first composition;

laying out a reinforcing mesh over the upper surface of a forming belt;

spacing said mesh above said forming belt;

depositing said first composition on said mesh to form a layer of said first composition, said layer of first composition having substantially uniform consistency;

allowing a portion of said first composition to pass through said mesh to said forming belt;

adding additional water to said formed layer of said first composition;

mixing a low density porous particle mixture with water to form a supply of wetted low density particles;

mixing said wetted low density porous particles with a predetermined amount of dry calcined gypsum to form a second composition;

depositing said second composition over said first layer to form a second layer having a substantial uniform consistency;

mixing said wetted fibers with a predetermined amount of dry calcined gypsum to form a third composition;

depositing said third composition over said second layer to form a third layer having a substantial uniform consistency; and compressing said mesh together with said three layers to embed said mesh in the surface of said first layer and to form a board composed of bonded fibers and gypsum with said mesh embedded in the surface thereof; and drying said board to provide a finished board.

7. The method of claim 6, including the additional step of causing a portion of said first composition to pass through the openings of said mesh prior to said compression step.

8. The method of claim 6, wherein said mesh is vibrated across its width at the point said mixed composition is deposited on said mesh.

9. The method of claim 6, including the additional step of adding water to said deposited layer of first composition before said deposited layer of first composition is compressed.

*10. The method of claim 1, contacting a surface of the mesh with a bar or roll, over the forming belt, to space the mesh above the surface of the forming belt.*

*11. The method of claim 10, wherein the bar is a mesh elevating bar and the surface of the mesh contacts the mesh elevating bar, over the forming belt, to space the mesh above the forming belt.*

*12. A system for producing a gypsum/fiber board having improved impact resistance, comprising:*

*a roll of reinforcing mesh having openings,*

*a forming belt having an upper surface over which the mesh from the roll of reinforcing mesh is laid out;*

*a mixer for mixing wetted, loose fibers and dry calcined gypsum to form a mixture of wetted, loose fibers and dry calcined gypsum and depositing said mixture on said mesh laid out over the upper surface of the forming belt to form a layer of said mixture, said layer of mixture having substantially uniform consistency, and to allow a portion of said mixture to pass through the openings of said mesh to the forming belt;*

*means for spacing the mesh above said forming belt;*

*means for adding additional water to said formed layer;*

*a compressing station for compressing said mesh together with said layer of mixture to embed said mesh in the lower surface of said layer and to form a board composed of bonded fibers and gypsum with said mesh embedded in the surface thereof; and*

*a dryer downstream of the compressing station for drying said board to provide a finished board.*

*13. The system of claim 12, wherein said means for spacing comprises a bar or roll for contacting a surface of the mesh, over the forming belt, to space the mesh above the surface of the forming belt.*

*14. The system of claim 13, wherein said means for spacing comprises a mesh elevating bar for contacting the surface of the mesh, over the forming belt, to space the mesh above the forming belt.*

*15. The system of claim 14, wherein said mixer comprises a mixing head comprising a spiked roll.*

*16. The system of claim 12, wherein said mixer comprises a mixing head comprising a spiked roll.*

*17. The system of claim 18, wherein said first mixer comprises a mixing head comprising a spiked roll.*

*18. A system for producing a gypsum/fiber board having improved impact resistance, comprising:*

*a roll of reinforcing mesh having openings,*

*a forming belt having an upper surface over which the mesh from the roll of reinforcing mesh is laid out;*

*a first mixer for mixing wetted, loose fibers and dry calcined gypsum to form a first composition of wetted, loose fibers and dry calcined gypsum and depositing said first composition on said mesh laid out over the upper surface of the forming belt to form a layer of said first composition, said layer of first composition having substantially uniform consistency, and to allow a portion of said first composition to pass through the openings of said mesh to the forming belt;*

*means for spacing the mesh above said forming belt;*

*means for adding additional water to said formed layer of said first composition;*

*means for mixing a low density porous particle mixture with water to form a supply of wetted low density particles;*

*a second mixer for mixing wetted low density porous particles, and dry calcined gypsum to form a second composition and depositing said second composition over said first layer to form a second layer having a substantial uniform consistency;*

*a third mixer for mixing wetted, loose fibers and dry calcined gypsum to form a third composition and depositing said third composition over said second layer to form a third layer having a substantial uniform consistency;*

*means for compressing said mesh together with said three layers to embed said mesh in the surface of said first layer and to form a board composed of bonded fibers and gypsum with said mesh embedded in the surface thereof; and*

*a dryer for drying said board to provide a finished board.*

*19. The system of claim 18, wherein said means for spacing comprises a bar or roll for contacting a surface of the mesh, over the forming belt, to space the mesh above the surface of the forming belt.*

*20. The system of claim 18, wherein said means spacing comprises a mesh elevating bar for contacting the surface of the mesh, over the forming belt, to space the mesh above the forming belt.*

* * * * *

UNITED STATES PATENT AND TRADEMARK OFFICE

CERTIFICATE OF CORRECTION

PATENT NO. : RE41,592 E
APPLICATION NO. : 11/038004
DATED : August 31, 2010
INVENTOR(S) : Michael R. Lynn et al.

It is certified that error appears in the above-identified patent and that said Letters Patent is hereby corrected as shown below:

Col. 14, claim 18, lines 18-20, delete "means for mixing a low density porous particle mixture with water to form a supply of wetted low density particles;"

Signed and Sealed this
Eighteenth Day of January, 2011

David J. Kappos

David J. Kappos
*Director of the United States Patent and Trademark Office*